United States Patent [19]

Noboru et al.

[11] Patent Number: 5,321,366

[45] Date of Patent: Jun. 14, 1994

[54] CAPACITANCE SENSOR APPARATUS OF DIVIDED MULTI-ELECTRODE TYPE

[75] Inventors: Masuda Noboru; Oosawa Tetsuo; Fujii Yasutaka, all of Nagaokakyo, Japan

[73] Assignee: Murata Mfg. Co. Ltd., Kyoto, Japan

[21] Appl. No.: 937,930

[22] Filed: Aug. 31, 1992

[51] Int. Cl.$^5$ .................. G01R 27/26; G08C 19/10
[52] U.S. Cl. .................. 324/663; 324/675; 324/690; 340/870.37
[58] Field of Search ........... 324/660, 661, 662, 663, 324/674, 675, 682, 686, 690; 340/870.37

[56] References Cited

U.S. PATENT DOCUMENTS

| | | | |
|---|---|---|---|
| 3,777,257 | 12/1973 | Geisselmann | 324/663 |
| 4,543,526 | 9/1985 | Burckhardt et al. | 324/660 |
| 4,882,536 | 11/1989 | Meyer | 324/671 |
| 4,922,181 | 5/1990 | Pullan | 324/690 |
| 5,097,216 | 3/1992 | Dimmick, Sr. et al. | 324/690 |
| 5,128,622 | 7/1992 | Masuda et al. | 324/682 |
| 5,198,777 | 3/1993 | Masuda et al. | 324/671 |
| 5,214,388 | 5/1993 | Vranish et al. | 324/662 |
| 5,231,359 | 7/1993 | Masuda et al. | 324/675 |

FOREIGN PATENT DOCUMENTS 4279801 10/1992 Japan .
4279802 10/1992 Japan .

Primary Examiner—Kenneth A. Wieder
Assistant Examiner—Christopher Tobin
Attorney, Agent, or Firm—Townsend and Townsend Khourie and Crew

[57] ABSTRACT

A plurality of sensor circuits each including an oscillator circuit, a detection electrode, and a ceramic resonator for changing a resonance frequency in accordance with a change in small electrostatic capacitance detected by the detector electrode and outputting a detection signal corresponding to a change in resonance frequency are formed on a circuit board. Detector electrode surfaces $A_1$ to $A_4$, $B_1$ to $B_4$, and $C_1$ to $C_4$ of the first to third sensor circuits are formed on the upper surface of the circuit board in a divisional manner. The detection surfaces of the respective sensor circuits are arranged to have codes in the scanning direction of an object to be detected. The fixed capacitances of the detection surfaces are decreased, and a change of state of the object can thus be detected at a high resolution. Since the detection surfaces of the respective sensor circuits are arranged to have codes in the scanning direction, detection data on a wide area can be obtained with a small number of sensor circuits.

6 Claims, 6 Drawing Sheets

SCANNING DIRECTION

CAPACITANCE SENSOR APPARATUS OF DIVIDED MULTI-ELECTRODE TYPE

BACKGROUND OF THE INVENTION

1. Field of the Invention

The present invention relates to a capacitance sensor apparatus of divided multi-electrode type having a plurality of sensor circuits continuously arranged for detecting a change in external electrostatic capacitance.

2. Description of the Prior Art

Apparatuses for detecting paper thickness are known. One apparatus uses a potentiometer and another apparatus is designed to detect a change in thickness as a change in electrostatic capacitance. This change in electrostatic capacitance can be measured as a change oscillating frequency of an oscillator circuit in accordance with the change in electrostatic capacitance. However, these apparatuses have poor detection precision and cannot detect the thickness and surface state of a sheet-like medium, e.g., paper or a film with a high sensitivity and high precision.

The present applicant previously proposed a capacitance sensor apparatus which can detect a change in small electrostatic capacitance with a high sensitivity of $1 \times 10^{-5}$ pF in U.S. Pat. No. 5,231,359, issued Jul. 27, 1993. This capacitance sensor apparatus will be referred to as '359 patent. As shown in FIG. 1, the '359 Patent is constituted by: a sensor circuit comprising an oscillator circuit 14 having a ceramic resonator 19, a resonance circuit 21 having a ceramic resonator 15 different from the ceramic resonator 19 of the oscillator circuit 14, a detector circuit 16, an amplifier circuit 17, and an AFC (Automatic Frequency Control) circuit 18; and a detector electrode 20.

The oscillator circuit 14 outputs an oscillation frequency signal having a fixed high frequency of 0.5 to 10 GHz. The detector electrode 20 confronts an object to be detected to detect a change in small electrostatic capacitance with respect to the object to be detected and includes the detected change in small electrostatic capacitance to the resonance circuit 21. The resonance circuit 21 changes the resonance frequency in accordance with the change in small electrostatic capacitance detected from the detector electrode 20, forms an amplitude modulation signal corresponding to the change in resonance frequency by using the oscillation frequency signal from the oscillator circuit 14 as a carrier, and applies it to the detector circuit 16 as the detection signal. The detector circuit 16 envelope detects a detection signal, converts it to a signal within the detection band of the small electrostatic capacitance detected by the detector electrode 20, and applies this signal to the amplifier circuit 17. The amplifier circuit 17 applies the envelope detection signal detected by the detector circuit 16 to a desired signal processing circuit. The AFC circuit 18 corrects the resonance frequency of the resonance circuit which is biased by such influence as an environmental change to stabilize the resonance frequency.

According to the '359 Patent, since the change in small electrostatic capacitance detected by the detector electrode 20 is detected as a change in resonance frequency of the resonance circuit 21, a change in small electrostatic capacitance which is as small as $1 \times 10^{-5}$ pF can be detected with a high sensitivity.

The present inventor derives from the '359 Patent and develops an apparatus suitable for detection of a sheet-like medium by utilizing this prior art.

To apply the prior art to detection of a sheet-like medium, a detector electrode 20 is constituted by an electrode plate having a length almost equal to the width of a sheet-like medium 3, as shown in FIG. 3. For example, as shown in FIG. 2, a ground electrode P is disposed to oppose the detector electrode 20 at a gap S through which the sheet-like medium 3 passes. A change in electrostatic capacitance, when the sheet-like medium 3 passes between the detector electrode 20 and the ground electrode P, it is detected by the detector electrode 20. The detected change is applied to the ceramic resonator 15 of the circuit shown in FIG. 1, thereby detecting the thickness, humidity-absorbing state, and surface roughness of the sheet-like medium 3, or a foreign material attached to the sheet-like medium 3.

However, when the detector electrode 20 is set to have a length almost equal to the width of the sheet-like medium 3, as shown in FIG. 3, the surface area of the detector electrode 20 is increased to increase its fixed capacitance Co. The resolution is decreased when the small electrostatic capacitance is to be detected.

In order to eliminate this problem, as shown in FIG. 4, a plurality of small detector electrodes 20 may be arranged in the widthwise direction of a sheet-like medium 3 to be connected to sensor circuits 22 similar to that shown in FIG. 1. When the plurality of capacitance sensor circuits 22 are arranged adjacent to each other in this manner, and the oscillating frequencies of oscillator circuits 14 of the respective capacitance sensor circuits 22 are slightly different from each other, the oscillating frequency of adjacent circuits can interfere with each other. This degrades the detection capability of the small electrostatic capacitance. Furthermore, when the sensor circuits are connected respectively to the plurality of detector electrodes 20, the number of capacitance sensor circuits 22 is largely increased to complicate the overall configuration, resulting in an increase in apparatus cost.

SUMMARY OF THE INVENTION

The present invention has been made in view of the above problems, and has as its object to provide a capacitance sensor apparatus of divided multi-electrode division type in which the fixed capacitance of the detector electrode is decreased to increase resolution of detection, thereby enabling detection of a wide area of an object to be detected with a smaller number of capacitance sensor circuits.

According to an aspect of the present invention, there is provided a capacitance sensor apparatus divided multi-electrode type in which a plurality of sensor circuits are formed each including an oscillator circuit for oscillating a frequency signal, a detector electrode for detecting a change in electrostatic capacitance with respect to an object to be detected, and a resonance circuit for changing a resonance frequency in accordance with the change in electrostatic capacitance detected by the detector electrode and outputting a signal corresponding to a change in resonance frequency as a detection signal, wherein the detector electrode of each sensor circuit has detection surfaces divided as a plurality of segment surfaces arranged in a direction intersecting with a scanning direction of the object to be detected, and the segment surfaces of detector electrodes of the respective sensor circuits are arranged to have predetermined codes in the scanning direction of the object to be detected.

According to another aspect of the present invention, the plurality of sensor circuits share the one oscillator circuit, and the common oscillator circuit applies a frequency signal to the resonance circuit of each sensor circuit.

According to still another aspect of the present invention, the detection surfaces of the detector electrode are formed on an upper surface of a circuit board made of an insulating material, a coupling conductor member to be connected to the resonance circuit is formed on a lower surface of the circuit board, and the detection surfaces and the coupling conductor member are connected to each other through a connecting conductor member extending through the circuit board.

DETAILED DESCRIPTION OF THE PREFERRED EMBODIMENTS

According to the present invention, a detection surface of a detector electrode of each sensor circuit is divided as a plurality of segment surfaces arranged in a direction intersecting with a scanning direction of an object to be detected, and the detection surfaces of the detector electrodes of the respective sensor circuits are arranged in accordance with predetermined codes in the scanning direction. Accordingly, when three sensor circuits are provided such that the detection surfaces of the detector electrodes of the respective sensor circuits are arranged to have, 3-bit gray codes in the scanning direction, assuming that the detection surface of the detector electrode constitutes one segment, the state of the object to be detected located within a region divided into 21 segments can be detected.

Preferred embodiments of the present invention will be described with reference to the accompanying drawings.

Figure 5:
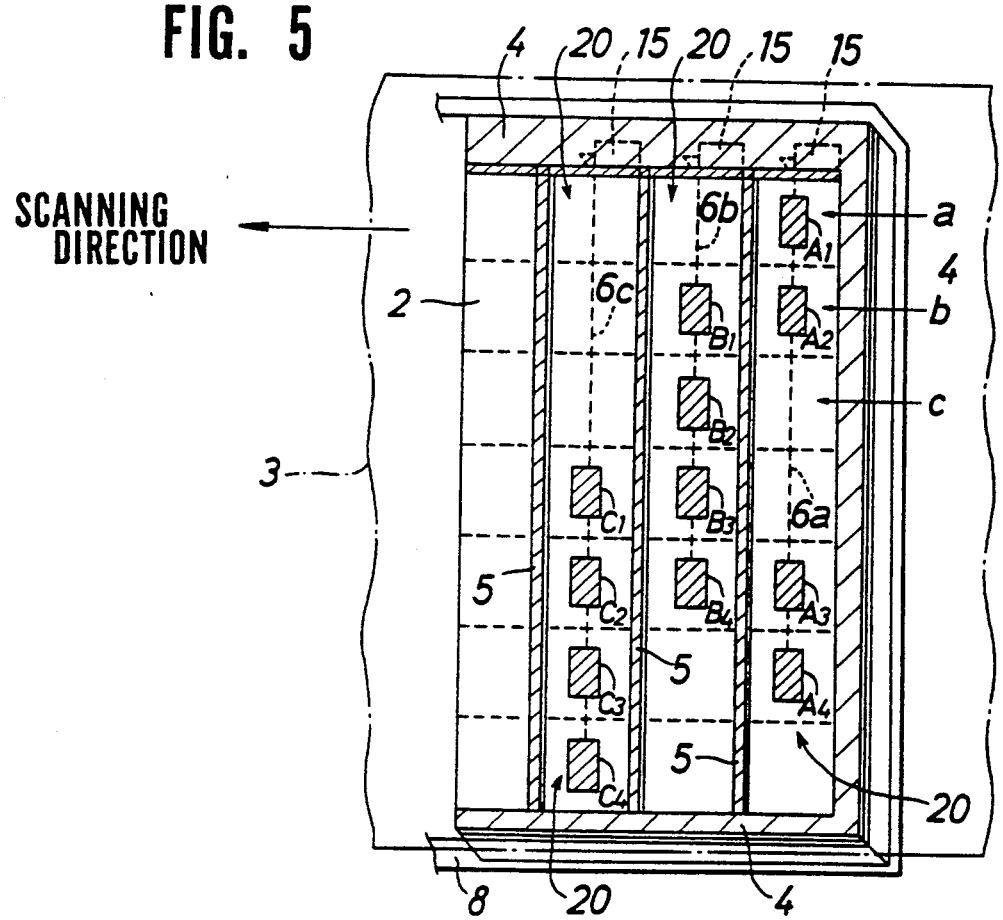
FIG. 5 is a plan view showing the arrangement of a detector electrode portion of a capacitance sensor apparatus of divided multi-electrode type according to an embodiment of the present invention.
Figure 6:
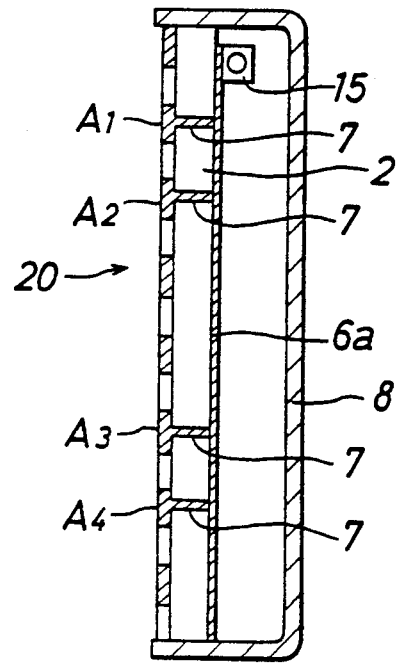
FIG. 6 is a longitudinal sectional side view of the detector electrode portion shown in FIG. 5.
Figure 7:
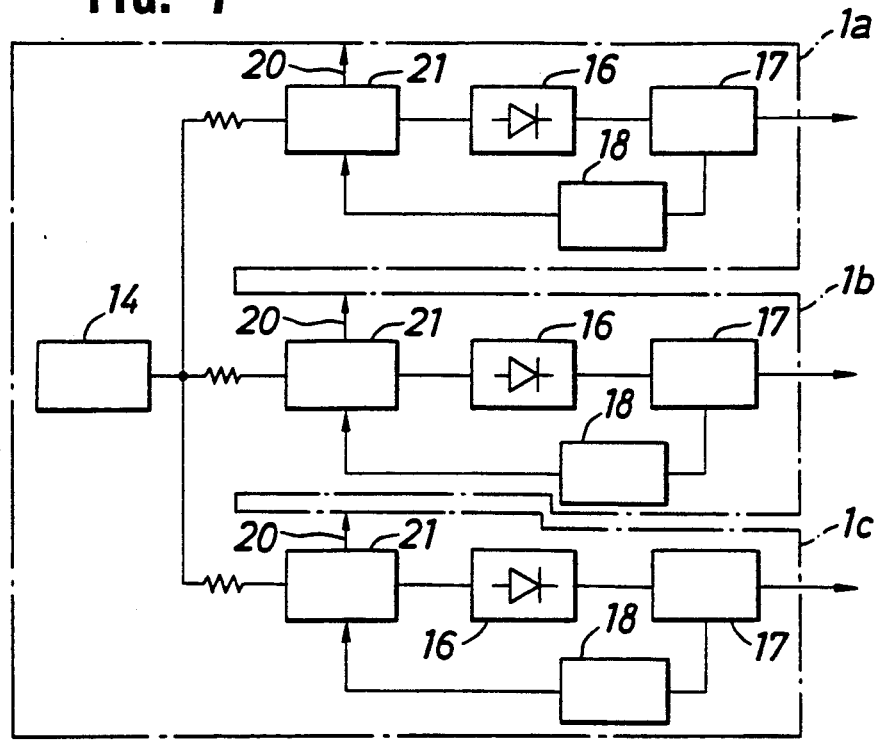
FIG. 7 is a block diagram showing the arrangement of the embodiment shown in FIG. 5.

FIGS. 5 and 6 show the arrangement of a detector electrode portion of a capacitance sensor apparatus of divided multi-electrode type according to an embodiment the present invention, and FIG. 7 is a block diagram of the apparatus of this embodiment. The apparatus of this embodiment comprises three capacitance sensor circuits 1$a$, 1$b$, and 1$c$. Each of the three capacitance sensor circuits 1$a$, 1$b$, and 1$c$ has a circuit configuration similar to that shown in FIG. 1, and the respective sensor circuits can be designed independently of each other. However, in this embodiment, the respective sensor circuits share an oscillator circuit 14 and a high-frequency oscillating frequency is supplied from a single oscillator circuit 14 to the resonance circuits of the respective sensor circuits. The respective sensor circuits are formed on a printed circuit board or an insulator circuit board, e.g., a laminated board.

As shown in FIG. 5, detection surfaces $A_1$ to $A_4$ of a detector electrode 20 of the first sensor circuit, detection surfaces $B_1$ to $B_4$ of a detector electrode 20 of the second sensor circuit, and detection surfaces $C_1$ to $C_4$ of a detector electrode 20 of the third sensor circuit are arranged on the upper surface of a circuit board 2 to form a plurality of segments divided in the widthwise direction of a sheet-like medium 3, i.e., in a direction intersecting (intersecting at the right angle in this embodiment) with the scanning direction of the sheet-like medium 3. A ground surface (equi-potential surface) 4 is formed on the periphery of the circuit board 2, and ground segment surfaces 5 are formed among the detection surfaces $A_1$ to $A_4$, $B_1$ to $B_4$, and $C_1$ to $C_4$ of the respective sensor circuits to be connected to the ground surface 4. The ground segment surfaces 5 and the ground surface 4 are set equal to or slightly higher than the height of the detection surfaces $A_1$ to $A_4$, $B_1$ to $B_4$, and $C_1$ to $C_4$ to block the adverse influence of an external stray capacitance and the electric field radiation on the respective detection surfaces by the ground surface 4. The ground segment surfaces 5 also serve to prevent interference with the adjacent detection surfaces.

The detection surfaces $A_1$ to $A_4$, $B_1$ to $B_4$, and $C_1$ to $C_4$ of the respective sensor circuits are arranged to have 3-bit gray codes in the scanning direction of the sheet-like medium 3. For example, the first row a has a code string of 001, the second row b has a code string of 011, and the third row has a code string of 010, thus forming gray codes in seven rows.

Coupling conductor members 6$a$, 6$b$, and 6$c$ made of very thin wires are formed on the side of the lower surface of the circuit board 2 in accordance with sputtering or photo-fabrication to extend continuously along the detection surfaces $A_1$ to $A_4$, $B_1$ to $B_4$, and $C_1$ to $C_4$ of the respective sensor circuits. The coupling conductor members 6$a$, 6$b$, and 6$c$ of the respective sensor circuits are connected to the detection surfaces $A_1$ to $A_4$, $B_1$ to $B_4$, and $C_1$ to $C_4$ of the corresponding sensor circuits through connecting conductor members 7 extending through the circuit board 2, thereby forming detector electrodes 20 in units of sensor circuits. On the lower surface of the circuit board 2, ceramic resonators 15 of resonance circuits 21 are disposed at positions in an extending direction from the arrays of the corresponding detection surfaces $A_1$ to $A_4$, $B_1$ to $B_4$, and $C_1$ to $C_4$ to be close to the corresponding coupling conductor members 6$a$ to 6$c$, and the respective ceramic resonators 15 are connected to the coupling conductor members 6$a$ to 6$c$ of the corresponding sensor circuits. The circuit board 2 on which the detector electrodes 20 and the respective sensor circuits are formed is surrounded by a conductor case 8.

Figure 9A:
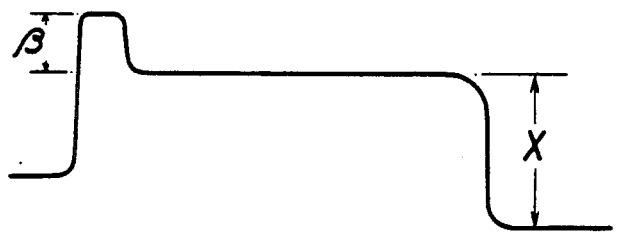
FIG. 9($a$) to FIG. 9($c$) are detection waveform charts of the respective sensor circuits obtained according to the embodiment shown in FIG. 5.
Figure 8:
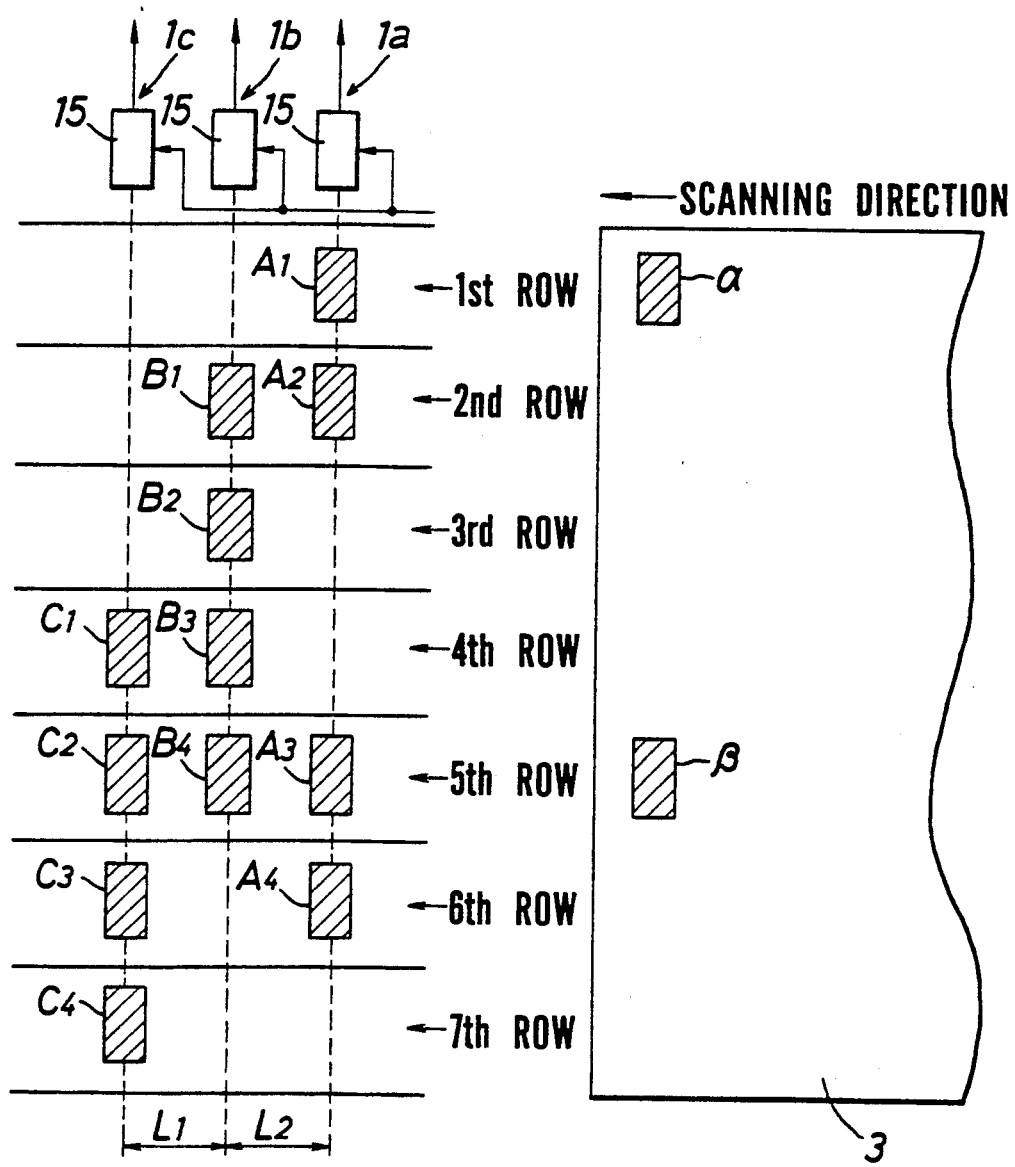
FIG. 8 is a diagram for explaining an operation of detecting a state of a sheet-like medium according to the embodiment shown in FIG. 5.

This embodiment has the arrangement as described above. A detection operation of the surface of the sheet-like medium 3 using the apparatus of this embodiment will be described. Assume that foreign substances α and β attach onto the surface of the sheet-like medium 3 at positions corresponding to the first- and fifth-row codes of the detector electrodes of the respective sensor circuits, as shown in FIG. 8. In this case, when the sheet-like medium 3 is scanned to pass immediately under the detection surfaces $A_1$ to $A_4$, $B_1$ to $B_4$, and $C_1$ to $C_4$ of the respective sensor circuits, the detection surfaces $A_1$ and $A_3$ of the first sensor circuit detect the foreign substances α and β, respectively. As a result, a detection signal obtained by superimposing the detection levels of α and β on a detection level X of the thickness of the sheet-like medium 3 can be obtained from the first electrostatic sensor circuit 1a, as shown in FIG. 9(c).

Figure 9B:
Figure 9C:
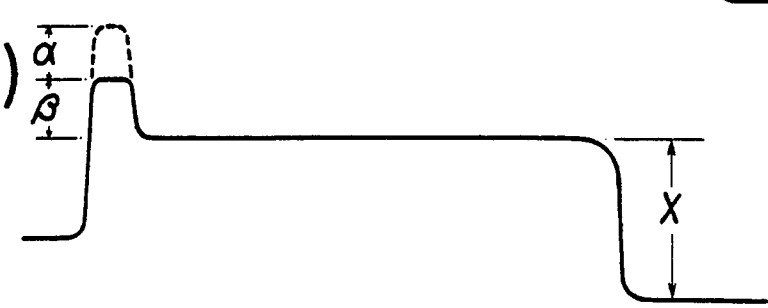

The detection surface $B_4$ of the second sensor circuit detects the foreign substance β, and its detection level is detected as the level of β, as shown in FIG. 9(b). The detection signal of the second capacitance sensor circuit 1b is detected after the detection signal of the first capacitance sensor circuit 1a with a time lag of $\Delta T_1$ corresponding to a gap $L_2$ between the first and second sensor circuits.

Similarly, the detection surface $C_2$ of the third sensor circuit detects the foreign substance β, and its detection level β is detected after the detection signal of the second sensor circuit with a time lag of $\Delta T_2$ corresponding to a gap L1 between the second and third sensor circuits. The time lags $\Delta T_1$ and $\Delta T_2$ are determined by a predetermined moving speed of the sheet-like medium 3. Therefore, when the detection signals of the respective capacitance sensor circuits shown in FIGS. 9(a) to 9(c) are analyzed, the wide range of the surface of the sheet-like medium 3 corresponding to a matrix of 7 rows×3 columns can be detected by only three capacitance sensor circuits 1a, 1b, and 1c. Furthermore, since the detection surfaces of the respective sensor circuits are disposed to have certain codes in the scanning direction of the sheet-like medium 3, the position data of a foreign substance or the like attached on the surface of the sheet-like medium 3 can be obtained, and the position data of the scanning direction can be obtained by analyzing the detection time lags of the respective capacitance sensor circuits.

Since the detection surfaces of the respective sensor circuits are divisionally arranged, the fixed capacitances $C_o$ of the respective detection surfaces are decreased. That is, since the electrode area can be cut half or less in comparison with a case where the electrodes are formed covering the entire width of the sheet-like medium 3, the fixed capacitances are decreased.

Although the impedances among the respective electrodes are very high in comparison with the frequency of 1 GHz, the change in capacitance caused by the sheet-like medium 3 is expressed as a low frequency. The impedances among the respective electrodes become negligibly low. Therefore, the adverse influence of the inductance components caused by the lengths of the coupling conductor members 6a, 6b, and 6c can be eliminated. As a result, a change of state of the sheet-like medium 3 can be detected with a high sensitivity at a high resolution. Furthermore, in this embodiment, since the respective sensor circuits share one oscillation circuit 14, interference will not be caused between the oscillating frequencies of the respective sensor circuits, and a small electrostatic capacitance can be reliably detected.

Figure 1:
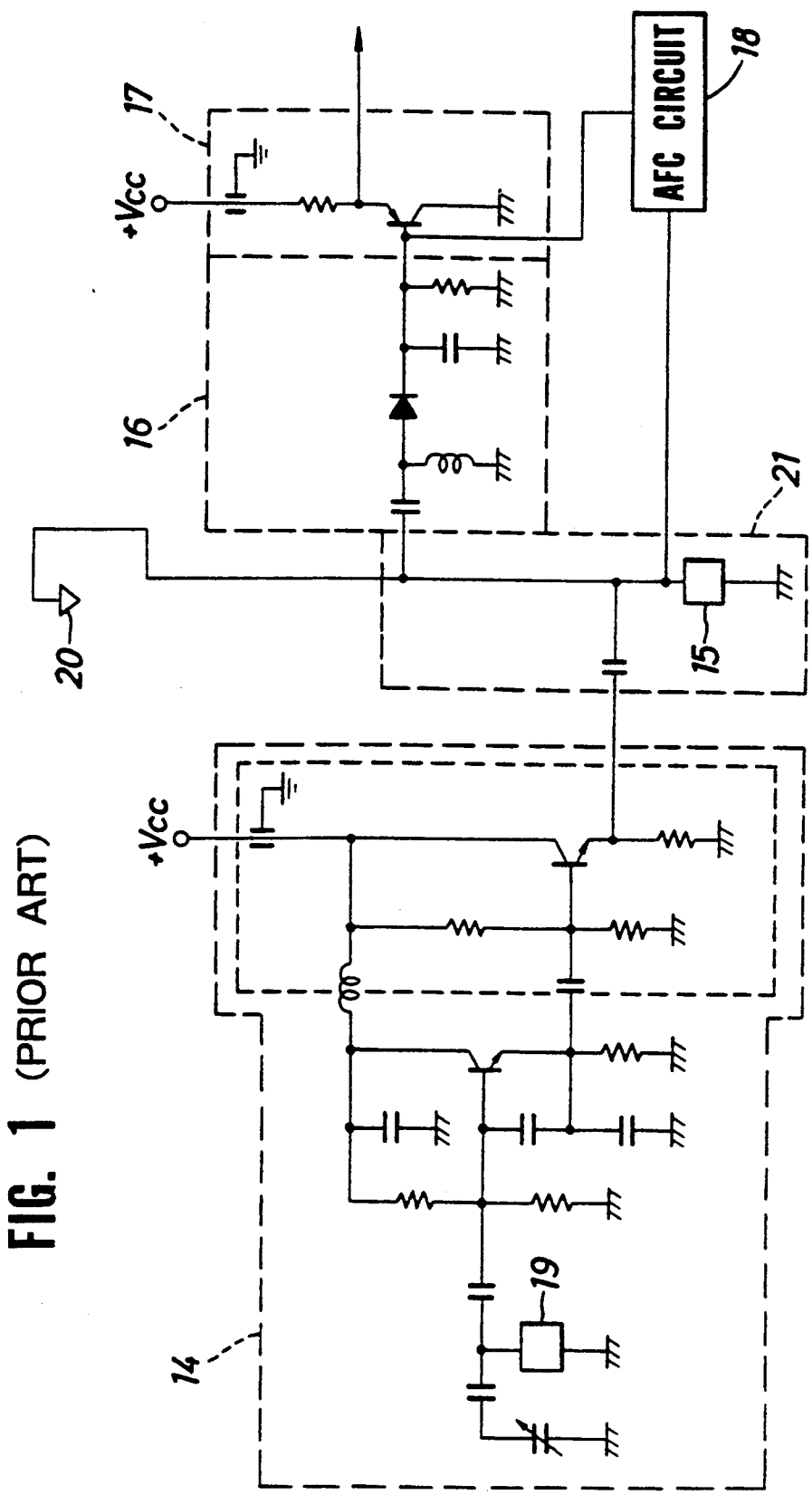
FIG. 1 is a circuit diagram of a conventional capacitance sensor apparatus of U.S. Pat. No. 5,231,359.
Figure 2:
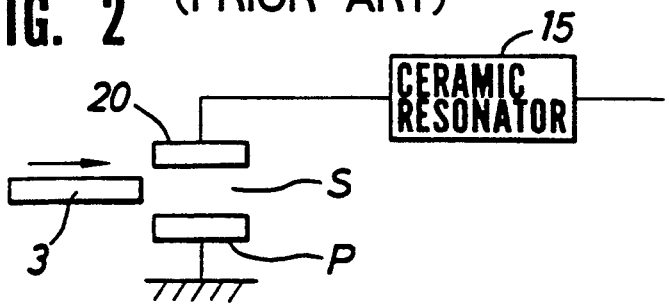
FIG. 2 is an explanatory diagram of an apparatus used for detecting a sheet-like medium with the prior art.
Figure 3:
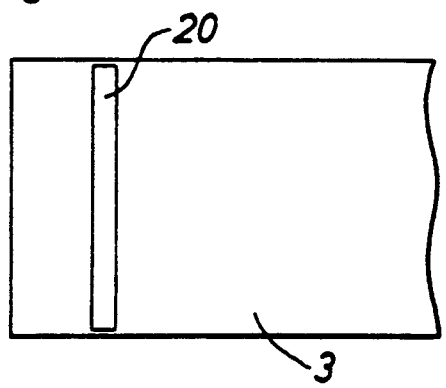
FIG. 3 is an explanatory diagram showing the shape of the detector electrode of the prior art together with the sheet-like medium.
Figure 4:
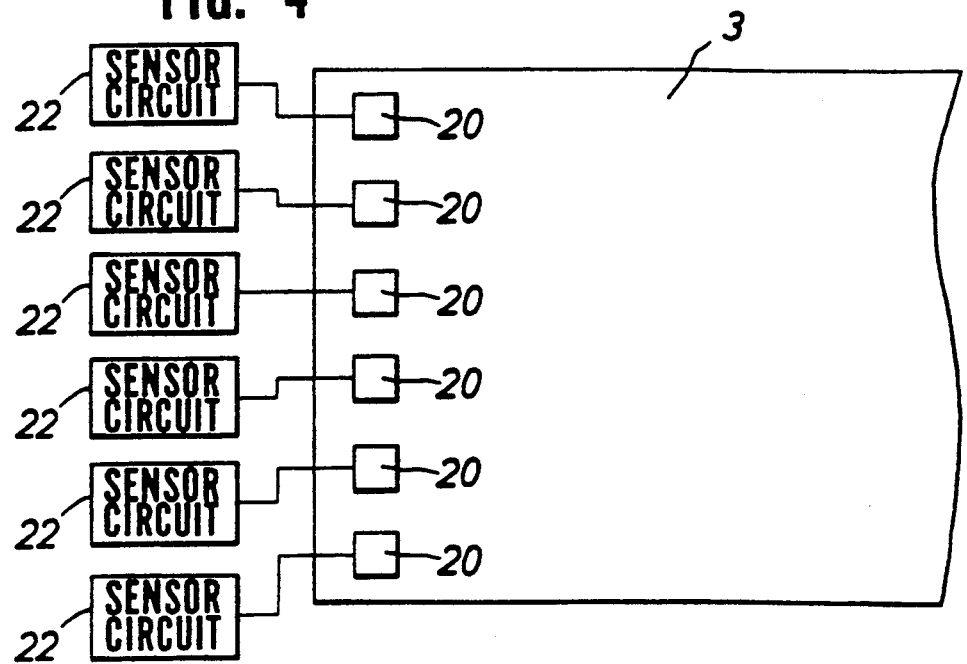
FIG. 4 is an explanatory diagram showing another conventional apparatus for detecting the state of the sheet-like medium with the prior art.

Referring to the circuit shown in FIG. 1, when the distance between the detector electrode 20 and the input/output terminal of the ceramic resonator 15 becomes n·λ/4 (where n is an integer of 1 or more and λ is the wavelength of the resonance frequency of the ceramic resonator 15) or more, the resonance frequency of the ceramic resonator 15 changes abruptly to cause instability, thus degrading the detection performance of the small electrostatic capacitance of the sheet-like medium 3. In order to solve this problem, the lengths of leads 1 connecting the coupling conductor members 6a to 6c and the ceramic resonators 15 must be set sufficiently smaller than λ/4. According to the present invention, the problem of instable resonance frequency is solved by forming the circuit shown in FIG. 1 on the circuit board 2 and arranging the input/output terminals of the ceramic resonators 15 close to the coupling conductor members 6a to 6c.

Figure 10:
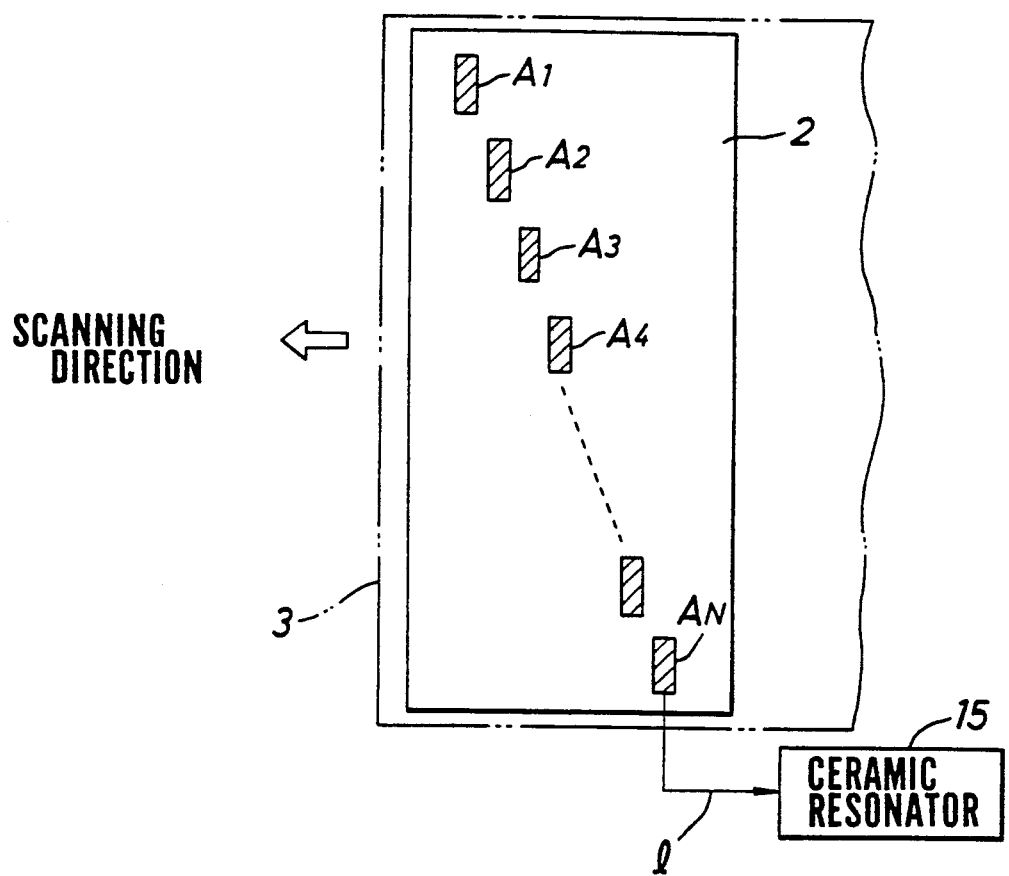
FIG. 10 is a plan view showing the arrangement of a detector electrode portion of another embodiment of the present invention.

The present invention is not limited to the embodiment described above, and various changes and modifications may be made. For example, although the detection surfaces $A_1$ to $A_4$, $B_1$ to $B_4$, and $C_1$ to $C_4$ of the respective sensor circuits are disposed in the direction intersecting with the scanning direction of the sheet-like medium 3 at the right angle in the above embodiment, they can be disposed in a direction obliquely intersecting with the scanning direction, as shown in FIG. 10. In the above embodiment, the detection surfaces of the detector electrodes of the respective sensor circuits are disposed to have 3-bit codes in the scanning direction of the sheet-like medium 3. However, they can be disposed to have 2-bit codes, 4-bit codes, or more. In this case, if four capacitance sensor circuits are provided and the detection surfaces are disposed to have 4-bit codes in the scanning direction, 15-row codes can be obtained to enable detection of a sheet-like medium having a larger width. Although the detection surfaces are disposed to have gray codes in the scanning direction in the above embodiment, they can be disposed to have BCD (Binary-Coded Decimal) codes or other codes.

As has been described above, according to the present invention, the following effects can be obtained:

(1) Since the detector electrode surfaces of the plurality of sensor circuits are divided in the form of a plurality of segments, the fixed capacitances of the detection surfaces can be decreased. That is, the ratio of the detection capacitance of the sheet-like medium to the fixed capacitance can be increased, and a change of the state of an object to be detected, e.g., a sheet-like medium can be detected at a high resolution.

(2) Since the detection surfaces of the respective sensor circuits are disposed to have predetermined codes in the scanning direction of the object to be detected, detection data on a wide area can be obtained with a smaller number of capacitance sensor circuits. In addition, since the detection surfaces are divisionally formed and disposed to have the predetermined codes, position data on a portion of the object to be detected where a state change occurs can be precisely obtained. Since detection data on a wide area can be obtained despite that the number of capacitance sensor circuits is decreased, as described above, the size and cost of the apparatus can be decreased by a decrease in number of capacitance sensor circuits.

(3) When the oscillator circuit is shared by the capacitance sensor circuits, a plurality of the sensor circuits can be operated by a single common oscillator circuit. Even if the respective sensor circuits are disposed close to each other, interference will not occur among the oscillating frequency of the respective sensor circuits, and highly reliable, stable detection data can be obtained on the object to be detected.

(4) Since the input/output terminals of the ceramic resonators arranged on the circuit board can be disposed close to the corresponding coupling conductor members, the resonance frequencies of the ceramic resonators can be reliably prevented from becoming unstable.

What is claimed is:

1. A capacitance sensor apparatus of divided multi-electrode type for measuring the capacitance change in an object conveyed along a path in a scanning direction adjacent an array of detector electrodes including:
    a plurality of respective sensor circuits, each sensor circuit operative to scan at least one strip along said object as said object is conveyed along said path in a scanning direction, each said sensor circuit comprising:
    a detector electrode for detecting a change in electrostatic capacitance with respect to an object to be detected,
    an oscillator circuit for outputting a frequency signal, and
    a resonance circuit for changing a resonance frequency in accordance with the change in electrostatic capacitance detected by said detector electrode and outputting a signal corresponding to a change in resonance frequency as a detection signal;
    said detector electrode(s) of a each sensor circuit has detection surfaces divided as a plurality of segment surfaces arranged across said path in said scanning direction with each said segment surface examining discrete strip along said object as said object passes under said segment surface; and
    said segment surfaces of detector electrodes of said respective sensor circuits are arranged to examine each strip in repeating sequences having predetermined different codes in the scanning direction of the object whereby detection of capacitance change along any strip is repeated in the different code of said segment surfaces in said strip to identify in the output of said sensor circuits said particular strip along said object where said capacitance change was detected.

2. An apparatus according to claim 1, wherein said plurality of sensor circuits have a single common oscillator circuit as the respective oscillator circuit adapted to supply a frequency signal to said resonance circuit of each sensor circuit.

3. An apparatus according to claim 1 wherein said detection surfaces of said detector electrode are formed on an upper surface of a circuit board made of an insulating material, a coupling conductor member to be connected to said resonance circuit is formed on a lower surface of said circuit board, and said detection surfaces and said coupling conductor member are connected to each other through a connecting conductor member extending through said circuit board.

4. An apparatus according to claim 1 wherein said segment surfaces of successive detectors are arrayed at right angles to the path of said object.

5. An apparatus according to claim 1 wherein said segment surfaces of successive detector are arrayed diagonally to the path of said object.

6. An apparatus according to claim 1 wherein said code is a binary array code.

* * * * *